Aug. 21, 1956  A. K. PETERSON  2,759,217
STRETCHING AND FORMING APPARATUS
Filed Nov. 15, 1954  3 Sheets-Sheet 1

ALBIN K. PETERSON,
INVENTOR.

By His Attorneys.
HARRIS, KIECH, FOSTER & HARRIS.

Aug. 21, 1956  A. K. PETERSON  2,759,217
STRETCHING AND FORMING APPARATUS
Filed Nov. 15, 1954  3 Sheets-Sheet 3

ALBIN K. PETERSON,
INVENTOR.

BY HIS ATTORNEYS.
HARRIS, KIECH, FOSTER & HARRIS.

United States Patent Office 2,759,217
Patented Aug. 21, 1956

2,759,217

STRETCHING AND FORMING APPARATUS

Albin K. Peterson, Torrance, Calif.

Application November 15, 1954, Serial No. 468,864

6 Claims. (Cl. 18—1)

The present invention relates to an apparatus for stretching and forming sheet material and, more particularly, to a stretching apparatus for forming thick sheets into thinner sheets to produce various desirable modifications in the properties thereof. The resulting sheets may be utilized in any suitable manner, e. g., they may be molded or otherwise formed or processed.

As an example of one application of the present invention, transparent airplane canopies, blisters, and the like have heretofore been made from plastic sheets produced by rolling or molding operations. Such canopies generally are quite brittle and are shattered when pierced by a bullet or other missile. It has been found that a thick sheet of plastic material formed by stretching while at an elevated temperature to a thickness approximately half its original thickness, and subsequently allowed to cool under tension, becomes much tougher and will not shatter when penetrated by a bullet, the projectile merely passing through and leaving a clean hole. As will be apparent, this is a tremendous advantage since the shattering of a canopy, blister or the like at high altitude may have serious consequences, whereas a small hole would not be disastrous and could readily be repaired as by plugging.

With such plastic materials in particular, in order to attain uniform sheet thickness and suitable optical qualities, it is necessary to stretch the sheet uniformly in all directions and to maintain the original plan form continuously throughout the process, a primary object of the invention being to provide an apparatus for this purpose.

Another example is the stretching and forming of magnesium or beryllium in a heated condition.

Another object is to maintain the sheet at a predetermined, elevated temperature throughout the forming process, this being accomplished by performing the stretching operation within an oven or the like.

Another object of the invention is to provide an apparatus having means for increasing the peripheral dimensions of the sheet at the same rate as the transverse dimensions thereof are increased so as to insure maintaining the plan form of the sheet constant.

More particularly, an object of the invention is to provide a plurality of gripping devices spaced along the periphery of the sheet and means to increase the spacing of such devices peripherally of the sheet in proportion to increases in the lateral dimensions of the sheet.

Another object is to provide an apparatus capable of operation on a rectangular sheet which includes four banks of gripping devices arranged in a rectangle and adapted to grip the four edges of the sheet, the apparatus including means for moving the four banks of gripping devices apart to stretch the sheet and including means for simultaneously increasing the spacing between the gripping devices in each bank along the corresponding sheet edge at a proportional rate.

Another object is to provide means for maintaining the four banks of gripping devices constantly in the form of a rectangle, this being accomplished by mounting each bank of gripping devices on a movable carriage and by providing means for maintaining each carriage in parallelism with a suitable reference at all times. A related object is to accomplish the latter function by providing each carriage with gears meshed with racks on a suitable frame.

Another object is to provide means for actuating and releasing all of the gripping devices simultaneously. In this connection, a related object is to provide gripping devices in the form of fluid operated clamps, the clamps being operated either hydraulically or pneumatically.

Another object is to provide means for transporting the sheet to be stretched to the gripping devices.

Still another object is to provide means for molding the stretched sheet into any desired configuration while still within the oven or other means for maintaining it at a predetermined, elevated temperature.

The foregoing objects, advantages and features of the invention, together with various other objects, advantages and features thereof which will become apparent, may be attained with the exemplary embodiment of the invention which is illustrated in the accompanying drawings and which is described in detail hereinafter.

Referring to the drawings.

Figure 1:
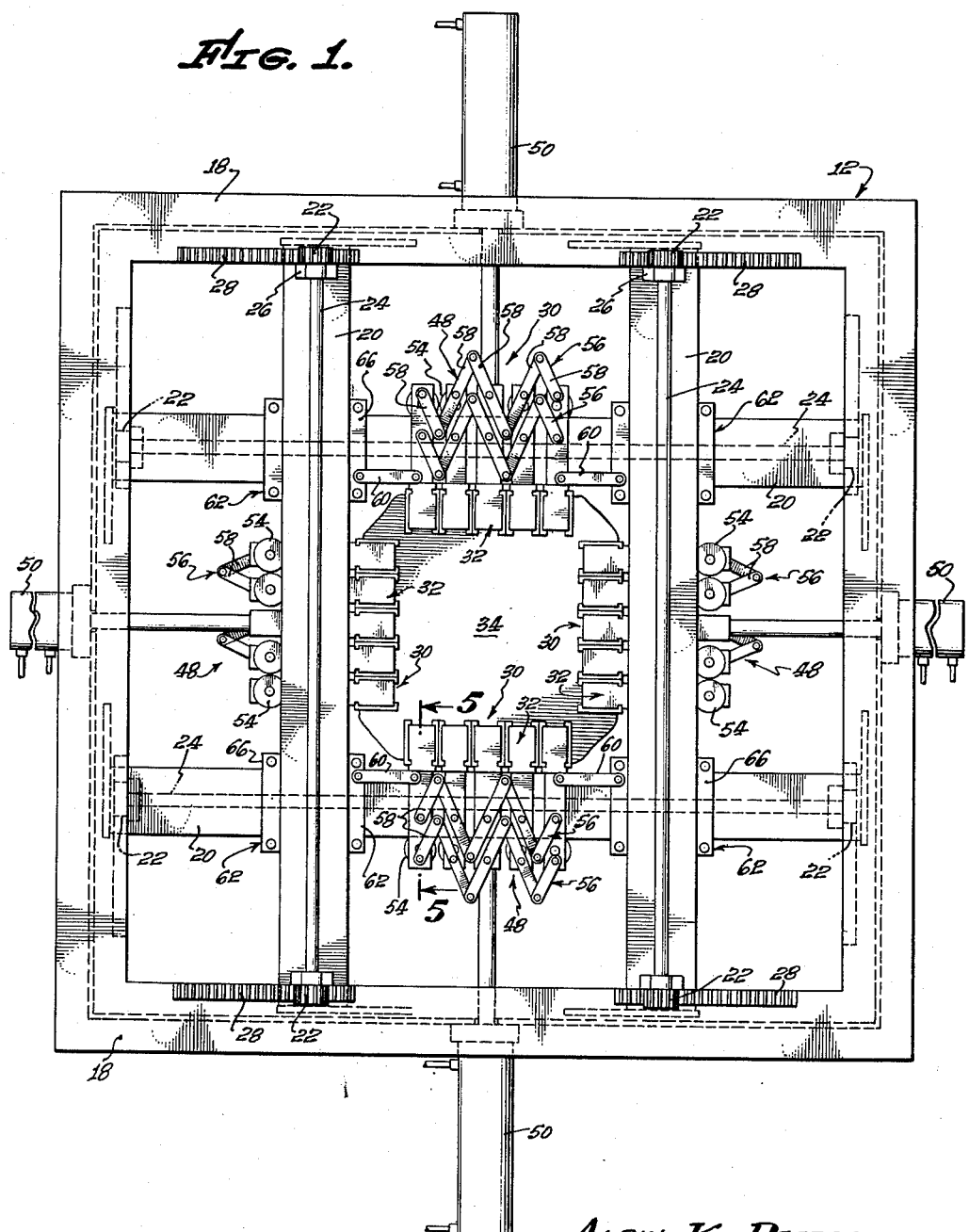
Figs. 1 and 2 are plan views of the invention, Fig. 1 showing the apparatus of the invention prior to a stretching operation, and Fig. 2 showing the apparatus after the stretching operation has been completed.
Figure 2:
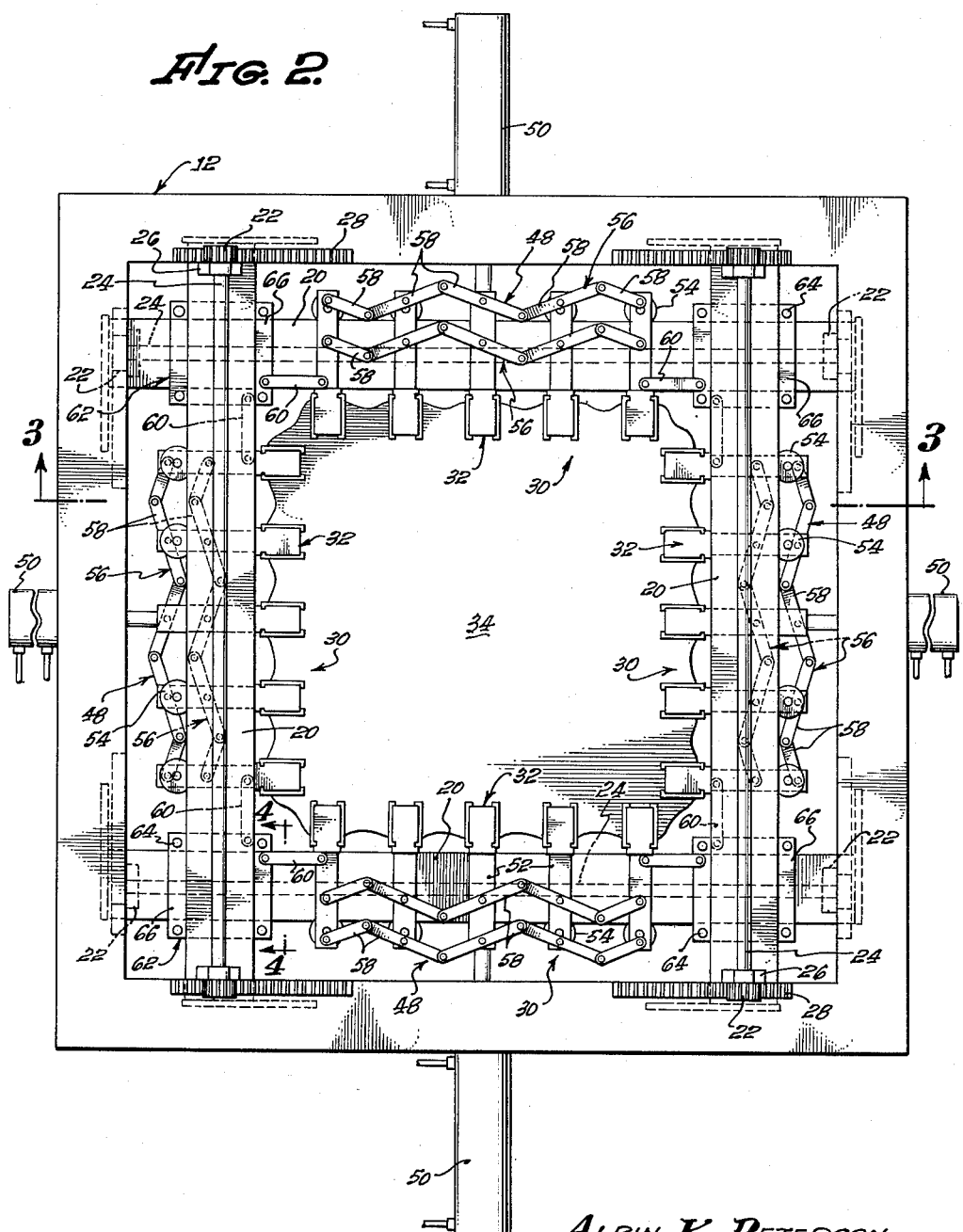

Referring to the drawings, the numeral 10 designates an oven or other compartment within which the temperature may be maintained at any desired predetermined value by any suitable means, not shown. Within the oven 10 is a rectangular frame 12 supported by posts 14 anchored to a floor 16, it being understood that the term "rectangular" is used generically herein to include "square." The frame 12 is shown as made up of I-beams, thereby providing guides or tracks 18 for four carriages 20. The latter are in the form of I-beams having ends disposed in and guided by the tracks 18. The carriages 20 are arranged to define a rectangle therebetween and, in order to insure that the carriages will always be parallel to their original positions, each carriage is provided with spur gears 22 fixed on a common shaft 24 which is journaled in bearings 26 on such carriage, each gear 22 meshing with a rack 28 on the frame 12.

Figures 4, 5:
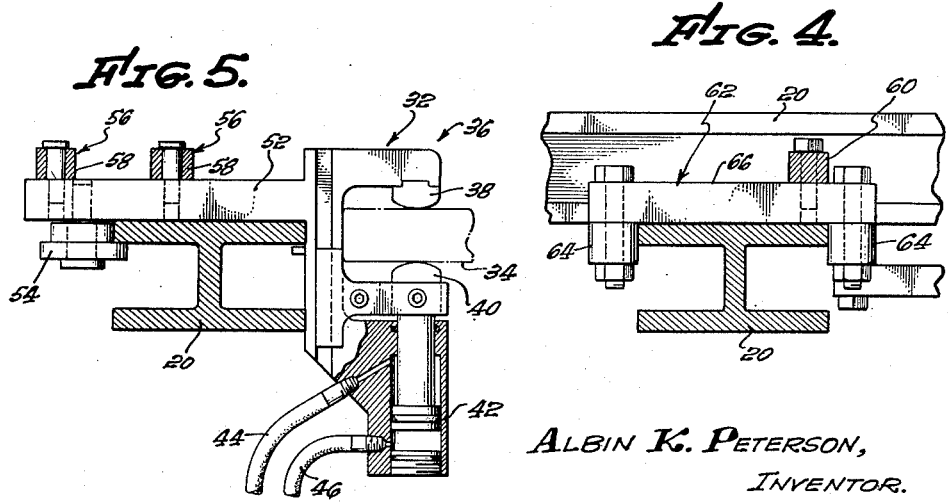
Fig. 4 is a fragmentary sectional view on an enlarged scale taken along the arrowed line 4—4 of Fig. 2.
Fig. 5 is a fragmentary sectional view on an enlarged scale taken along the arrowed line 5—5 of Fig. 1 of the drawings.

On each carriage 20 is a bank 30 of gripping devices 32, the banks of gripping devices being adapted to grip the respective edges of a sheet 34. As best shown in Fig. 5, each gripping device preferably comprises a fluid operated clamp 36 having a fixed jaw 38 and a movable jaw 40 to which is connected a piston 42 operable by hydraulic or pneumatic pressure from a suitable source, not shown, through fluid lines 44 and 46.

Means 48 are provided for increasing the spacings of the gripping devices of the banks 30 along the respective edges of the sheet 34 as the carriages 20 are moved outwardly to stretch the sheet, the carriages being actuated by fluid operated units 50 comprising cylinders mounted on the frame 12 and having therein pistons, not shown, connected to the respective carriages. The units 50 may be hydraulically or pneumatically operated from any suitable source, not shown, a common source preferably being employed to insure application of equal forces to all four edges of the sheet 34.

Considering the manner in which the gripping devices 32 of each bank 30 are moved toward and away from each other by the means 48 as the carriages 20 are moved inwardly and outwardly, and referring particularly to Fig. 5, each gripping device engages one side of the corresponding carriage 20 and is provided with an arm 52 which extends across the corresponding carriage and which carries a roller 54 engaging the opposite side of the corresponding carriage. Thus, each carriage 20 provides track or guide means for the bank 30 of gripping devices 32 carried thereby. Each means 48 comprises two series 56 of links 58, although one such series may be utilized if desired, two being preferable to insure maintaining the gripping devices in parallelism as they are moved toward and away from each other. The links 58 of each series are pivotally interconnected and are pivotally connected to the respective gripping devices 32 of the corresponding bank 30, each link series 56 comprising a semi-scissors mechanism. The gripping devices 32 at the ends of the banks 30 have pivotally connected thereto links 60 which, in turn, are pivotally connected to rectangular frames 62 located at the respective intersections of the carriages 20, each frame engaging the edges of the two carriages forming the corresponding intersection. As best shown in Fig. 4, each frame 62 is provided with rollers 64 engaging the edges of one of the carriages associated therewith and is provided with bars 66 slidable along the edges of the other carriage associated therewith. Thus, as will be apparent, as the carriages 20 are moved inwardly and outwardly the frames 62 also move inwardly and outwardly along the associated carriages to remain at the corresponding carriage intersections. Such inward and outward movement of the frames 62 is transmitted through the links 58 and 60 to the gripping devices 32 to decrease and increase the spacings of the gripping devices 32 along the carriages 20. Consequently, as the sheet 34 is stretched, the spacings of the gripping devices 32 along the sheet edges are increased at a proportional rate so as to maintain the plan form of the sheet constant as it is stretched.

Figure 3:
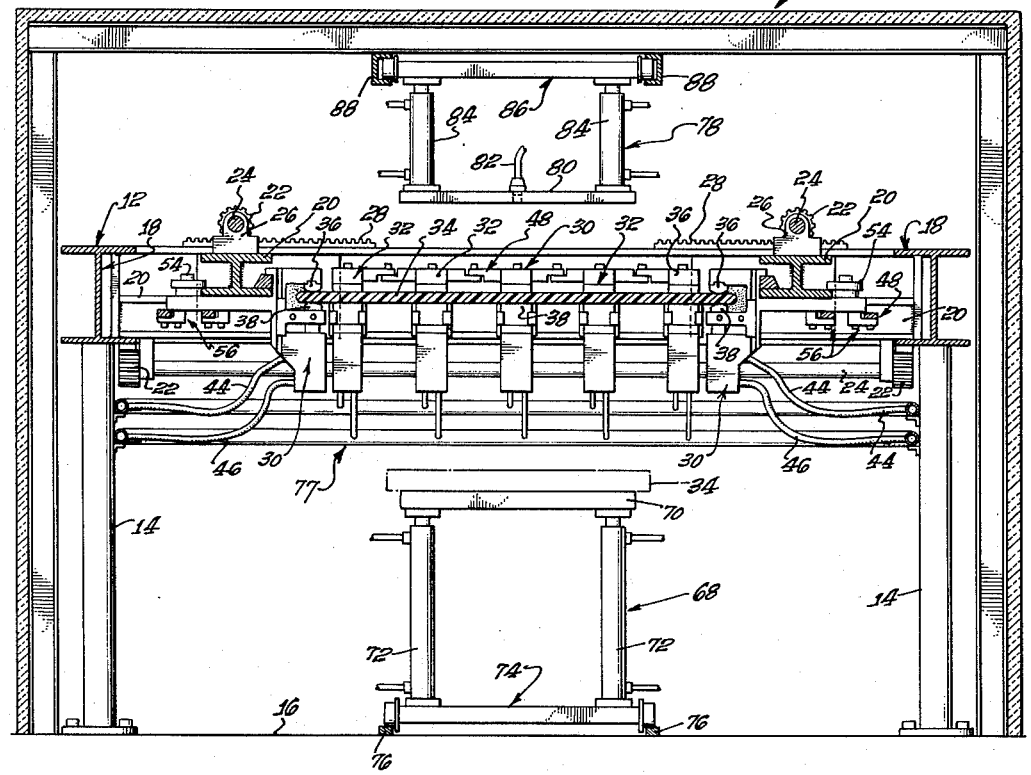
Fig. 3 is a sectional view taken along the arrowed line 3—3 of Fig. 2.

Considering the operation of the apparatus, the sheet 34 to be stretched is loaded, as best shown in Fig. 3 of the drawings, on a carriage 68 provided with a sheet-supporting plate 70 mounted on jacks 72, the latter being carried by a wheeled chassis 74 running on rails 76. The sheet 34 may be placed on the plate 70 outside of the oven 10 and the carriage 68 then run into position under the stretching apparatus along the rails 76. Thereafter the jacks 72 are actuated in any suitable manner, either pneumatically, hydraulically or otherwise, to elevate the sheet 34 into the plane of the gripping devices 32, the carriages 20 being moved outwardly sufficiently by the fluid operated units 50 to permit the sheet to be received between the gripping devices. Subsequently the fluid operated units 50 are energized to move the carriages 20 inwardly with the jaws 38 and 40 of the gripping devices 32 separated, to cause the jaws of the gripping devices to receive the sheet edges therebetween. The gripping devices 32 are then energized, pneumatically, hydraulically, or otherwise, to cause the jaws 38 and 40 thereof to grip the sheet edges. With the fluid operated gripping devices 32 shown, the fluid pressure applied is just sufficient to maintain the desired grip on the sheet edges without producing excessive deformation of the sheet. Also, the devices 32 may be operated simultaneously readily by connecting them to a common fluid pressure source 77.

With the interior of the oven 10 maintained at a predetermined temperature, which temperature may be of the order of magnitude of 400° F., for example, for typical plastic materials, fluid pressure is applied to the fluid operated units 50 to place the sheet 34 in tension. As will be apparent, by applying fluid pressure to the fluid operated units from a common source, the same tension is applied to the sheet 34 in all directions. The sheet 34 is gradually stretched for a substantial period, e. g. thirty minutes, to permit uniform stretching and forming of the sheet. In other words, the stretching operation is carried out so gradually that the material of the sheet 34 flows uniformly to maintain the thickness of the sheet uniform throughout its area.

After the desired reduction in thickness has been attained, the time for which will vary with the particular material being stretched and the applied temperature, the sheet is then cooled and the gripping devices are released to permit the carriage 68 to receive the stretched sheet, the sequence of operations being the reverse of that described previously. The stretched sheet may then be removed from the oven 10 for use or for further processing in any suitable manner. However, the stretched sheet may be formed into any desired configuration, such as an airplane canopy or blister, within the oven 10, if desired. This may be accomplished in various ways. For example, after the sheet has been stretched, but before it has been cooled and before the grippings devices 32 are released, the sheet may be formed into any desired configuration by means of a male die, not shown, placed on the plate 70 of the carriage 68 and forced upwardly against the sheet by means of the jacks 72, the sheet then being allowed to cool while held against such male die by the jacks 72 and the gripping devices 32. In this connection it will be noted that anchoring the posts 14 to the floor 16 prevents upward movement of the frame 12 under such conditions, twisting of the carriages 20 being prevented by disposing their ends in the tracks 18 as hereinbefore discussed.

Another way in which the stretched sheet can be formed into any desired configuration is by the use of a female die on the carriage 68 under the stretched sheet, together with a forming means 78 mounted on the ceiling of the oven 10. The means 78 comprises a pressure plate 80 equipped with an air inlet 82 and adapted to be raised and lowered by jacks 84, preferably fluid operated, on a wheeled chassis 86 mounted on rails 88. As will be apparent, by utilizing a female die on the carriage 68 in contact with the lower surface of the stretched sheet, and by introducing air through the air inlet 82 with the pressure plate 80 in contact with the upper surface of the stretched sheet, the sheet may be formed to the configuration of the female die by air pressure, as is well known in the art.

It will be understood that the foregoing are not intended to delimit processing or utilization of the stretched sheet, but are merely illustrative of such processing or utilization.

Although I have disclosed an exemplary embodiment of my invention herein for purposes of illustration, it will be understood that various changes, modifications and substitutions may be incorporated therein without departing from the spirit of the invention as defined by the claims hereinafter appearing.

I claim as my invention:

1. In an apparatus for stretching a rectangular sheet, the combination of: four carriages forming a rectangle; four banks of gripping devices respectively carried by said carriages and respectively adapted to grip the edges of the sheet; means for moving said carriages inwardly and outwardly relative to the center of the rectangle defined thereby; and means for simultaneously moving said gripping devices of each bank toward and away from each other as said carriages are moved inwardly and outwardly.

2. An apparatus as defined in claim 1 including means for maintaining the carriages on opposite sides of said rectangle in parallelism.

3. An apparatus as defined in claim 1 including means for maintaining the carriages on opposite sides of said rectangle in parallelism, including interconnected gears at the respective ends of each of said carriages respectively meshed with stationary racks at the respective ends thereof.

4. An apparatus as defined in claim 1 wherein said means for moving the gripping devices of each bank toward and away from each other includes a series of pivotally interconnected links respectively pivotally connected to the gripping devices of such bank, the gripping devices at the ends of such bank respectively being connected to the carriages forming adjacent sides of said rectangle.

5. An apparatus as defined in claim 1 including means for maintaining the sheet at a predetermined temperature.

6. An apparatus as defined in claim 1 including means for delivering the sheet to said gripping devices.

References Cited in the file of this patent

UNITED STATES PATENTS

| | | |
|---|---|---|
| 2,297,645 | Bailey | Sept. 29, 1942 |
| 2,490,781 | Cloud | Dec. 13, 1949 |
| 2,560,038 | Trainer | July 10, 1951 |
| 2,659,931 | Dettmer | Nov. 24, 1953 |